United States Patent Office 3,395,214
Patented July 30, 1968

3,395,214
ANTIPERSPIRANT COMPOSITION PROVIDING A READILY COLLAPSIBLE SPRAYABLE FOAM
Phillip L. Mummert, Wilmette, Ill., assignor to The Scholl Mfg. Co., Inc., Chicago, Ill., a corporation of New York
No Drawing. Filed Jan. 9, 1964, Ser. No. 336,642
2 Claims. (Cl. 424—47)

The present invention relates to an improved type of antiperspirant and deodorant composition for use on the skin.

Various astringent compositions have heretofore been proposed for use as agents for controlling excessive perspiration and diminishing odor. Most of these compositions are based upon the use of aluminum salt such as aluminum sulfate or less irritating materials such as aluminum chlorohydroxide. These compositions have been applied by various means such as in the form of creams, powders, lotions, roll-ons, squeeze bottle sprays, and aerosol mist sprays. Regardless of the method of application, however, the user still cannot easily control the rapidity of and the density of applications of the product without encountering considerable inconvenience. Cream preparations, while they are perhaps the most efficient of the various means of application, are necessarily greasy to the touch and are likely to cause stains. Powder preparations are not readily absorbed on the skin, and it is difficult to confine the contents of a can to a limited and specific area on the skin. Lotions used for this purpose are normally viscous liquids which require an applicator subject to contamination. In addition, the brush or sponge applicator usually furnished with lotions cannot adequately penetrate into the area without several applications. Roll-on type dispensers cannot adequately carry sufficient amounts of the active ingredient to thoroughly penetrate the hair and reach the skin surface so that they are not particularly advantageous in other than mild cases of perspiration. Squeeze bottle sprays and aerosol mists fall short of adequacy since if sufficient active ingredient is sprayed to the desired area, then the area becomes quite wet.

It is accordingly an object of the present invention to provide an improved system for the application of antiperspirant compositions onto the human skin which does not suffer from the defects of the various systems heretofore employed.

A further object of the invention is to provide an improved antiperspirant composition in the form of a relatively dry, readily collapsible foam which can be metered out in just the right quantity at the desired areas.

Still another object of the invention is to provide an improved antiperspirant composition which penetrates completely into the desired areas without leaving a residue on the fingers and without leaving a wet condition in the area of application.

The present invention involves the employment of a readily collapsible, relatively dry foam as a carrier for an antiperspirant composition. The foam can be applied through conventional applicator bottles for foams, such as the type employed for shaving creams. The user can spray the active ingredient directly on the skin where needed, or he can spray a small deposit on the forefinger of the hand and apply it to the desired area. In either case, the puff of foam readily spreads without a greasy or sticky feel, and dries almost instantly. The user can easily regulate the amount of antiperspirant composition applied in accordance with the size and type of area to be covered, and the dry foam disappears readily with light massage.

The composition of the present invention is basically a relatively dry, readily collapsible foam in which there is suspended an active antiperspirant material. The antiperspirant material is dispersed in a non-volatile, non-toxic cosmetic carrier, in combination with a volatile solvent, and water. The combination of the active antiperspirant material and the foregoing ingredients is referred to as the base of the composition. This base is then combined with a sufficient amount of a liquefied normally gaseous propellent to provide a suitable foam.

While proportions of the ingredients may vary depending upon the particular materials employed or the consistency desired, I have found that suitable proportions include from 1 to 50% by weight of the non-volatile, non-toxic carrier, from 20 to 60% by weight of the volatile solvent, from 10 to 70% by weight of water, and from 15 to 35% of the active antiperspirant material. This base is then combined with a liquefied normally gaseous propellent, the latter constituting about 10 to 15% by weight of the entire composition.

The non-volatile carrier may be any of a wide variety of cosmetic carriers which have heretofore been employed in topical preparations. The carrier should be, of course, non-toxic and is preferably non-ionic. The carrier may be one of the following group of materials, although the following list is by no means exclusive:

Propylene glycol
Stearic acid
Cetyl alcohol
Diethylene glycol
Ethyloxylated lanolin
Polyoxyethylene ethers
Polyoxyethylene sorbitol lanolin
Polyoxyethylene sorbitan monopalmitate
"Fluinol" (a water soluble lanolin)
"Veegum" (a magnesium aluminum silicate which forms gels with water)
Isopropyl myristate
"Polawax" (stearyl alcohol-ethylene oxide reaction product)
Glycerine
Stearyl alcohol
"Polysorbate" (polyoxyethylene sorbitan mono-oleate)

The volatile solvent is preferably an alcohol, such as ethanol or isopropanol. The only requirement regarding the solvent is that it be non-irritating to the skin and that it be readily volatizable upon application to the skin.

The active antiperspirant composition preferably includes one or more aluminum salt such as aluminum sulfate and aluminum chlorohydroxide. The latter is also known as aluminum chlorohydrate and has an approximate atomic ratio of aluminum-chlorine of 2 to 1 and an empirical formula of $Al_2(OH)_5Cl$ in aqueous solution. Other aluminum salts such as aluminum chloride may also be used but when used, should be used in combination with less irritating salts or in combination with a buffering agent.

Particularly good results are obtained when the antiperspirant portion of the composition contains allantoin or derivatives of allantoin such as aluminum chlorohydroxy allantoinate. The compound allantoin (also known as 5-ureidohydantoin) and its derivatives are known to be stimulators of cell proliferation and tissue growth. In addition, it is a non-irritating, non-toxic debriding agent. The addition of allantoin itself serves to correct or at least minimize irritation caused to some individuals upon using an aluminum base product. In fact, antiperspirant compositions which contain allantoin or its derivatives provide relief to former areas of irritation, and even healing and complete eradication of such areas.

The following specific example illustrates the manner in which the various ingredients are combined in the formulation of the improved antiperspirant composition.

Example

One part of cetyl alcohol and four parts of "Polawax" were heated to 70° C., and 15 parts of a "Veegum" emulsion containing 1% "Veegum" in water was added to the resulting molten material. 19.5 parts of aluminum chlorohydroxide were added to 19 parts water. To this was added 7 parts of aluminum sulfate and 0.5 part of aluminum chlorohydroxy allantoinate. This solution was heated to 70° C. and added slowly to the emulsified "Polawax" emulsion. About 40 parts of alcohol and perfume were then added slowly to the resulting mixture with constant agitation, while the mixture was cooling but was still at a temperature of about 50 to 60° C. This base was then combined with a propellant such as one of the "Freon" series or propane or isobutane using conventional techniques for cold packing. The resulting composition was stored in a dispensing bottle having an orifice suitable for the ejection of foam under pressure.

The resulting foam could be readily applied to the underarm areas and penetrated quickly into the skin. Within a few seconds, the foam had disappeared, and no feeling of wetness was encountered. The foam composition was considerably easier to use then any commercially available material of comparable antiperspirant effectiveness.

It should be evident that various modifications can be made to the described embodiments without departing from the scope of the present invention.

I claim as my invention:
1. An antiperspirant composition comprising a carrier consisting essentially of from 1 to 50% by weight of a mixture of cetyl alcohol, a stearyl alcohol-ethylene oxide reaction product emulsifier, and a gel forming magnesium aluminum silicate, from 20 to 60% of a volatile alcohol solvent, from 10 to 70% water, from 15 to 35% of an active antiperspirant material consisting essentially of a mixture of aluminum sulfate, aluminum chlorohydroxide and allantoin, and a sufficient amount of a liquefied normally gaseous propellant to provide a readily collapsible sprayable foam.
2. The composition of claim 1 in which said propellant constitutes from 10 to 15% by weight of the composition.

References Cited
UNITED STATES PATENTS

| | | | |
|---|---|---|---|
| 2,761,867 | 9/1956 | Mecca | 167—90 |
| 3,131,152 | 4/1964 | Klausner | 252—305 |
| 3,211,620 | 10/1965 | Henkin | 167—90 |

OTHER REFERENCES

Harry, Moden Cosmeticology, pub. by Leonard Hill, London, 1955, pp. 430, 552, 562.

Shepherd, Aerosols: Sci. and Tech., Interscience Pub., Inc., N.Y., 1961, pp. 157–161, 351.

Soap & Chem. Spec., 36:5, May 1960, pp. 204, 205.

ALBERT T. MEYERS, *Primary Examiner.*

A. FAGELSON, *Examiner.*